United States Patent
Wang et al.

(10) Patent No.: US 12,182,975 B2
(45) Date of Patent: Dec. 31, 2024

(54) METHOD FOR PROCESSING IMAGE, RELATED DEVICE AND STORAGE MEDIUM

(71) Applicant: BEIJING XIAOMI MOBILE SOFTWARE CO., LTD., Beijing (CN)

(72) Inventors: Xiaotao Wang, Beijing (CN); Yanan Li, Beijing (CN); Guangqi Shao, Beijing (CN); Lei Lei, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 286 days.

(21) Appl. No.: 17/133,602

(22) Filed: Dec. 23, 2020

(65) Prior Publication Data

US 2021/0407052 A1    Dec. 30, 2021

(30) Foreign Application Priority Data

Jun. 30, 2020 (CN) .......................... 202010623971.7

(51) Int. Cl.
G06K 9/00 (2022.01)
G06F 18/22 (2023.01)
G06T 5/50 (2006.01)
G06T 5/77 (2024.01)

(52) U.S. Cl.
CPC ................ *G06T 5/77* (2024.01); *G06F 18/22* (2023.01); *G06T 5/50* (2013.01); *G06T 2207/20081* (2013.01); *G06T 2207/20084* (2013.01); *G06T 2207/20221* (2013.01)

(58) Field of Classification Search
CPC . G06T 5/005; G06T 5/50; G06T 2207/20081; G06T 2207/20084; G06T 2207/20221; G06K 9/6201
USPC ............................................. 382/218
See application file for complete search history.

(56) References Cited

U.S. PATENT DOCUMENTS 9,014,500 B2    4/2015  Shuster
2018/0005063 A1  1/2018  Chan

FOREIGN PATENT DOCUMENTS

CN    110933299 A  *  3/2020  ......... H04N 5/23219

OTHER PUBLICATIONS

Liu, Linrunjia, Cindy Cappelle, and Yassine Ruichek. "Image-based place recognition using semantic segmentation and inpainting to remove dynamic objects." Image and Signal Processing: 9th International Conference, ICISP 2020, pp. 262-270 (Year: 2020).*
Kotsuka, Toru, et al. "Adaptive Reference Image Selection for Temporal Object Removal from Frontal In-vehicle Camera Image Sequences." VISAPP (1). 2015. (Year: 2015).*

(Continued)

*Primary Examiner* — Jonathan S Lee
(74) *Attorney, Agent, or Firm* — Syncoda LLC; Feng Ma

(57) ABSTRACT

A method for processing an image includes first obtaining a media image. The media image has a target scene object at least partially shielded. A target shielding object is determined from the media image. The target shielding object at least partially shields the target scene object. Image inpainting is performed on a first region of the media image corresponding to the target shielding object to generate a target media image.

18 Claims, 8 Drawing Sheets

(56) References Cited

OTHER PUBLICATIONS

Ma, Jie, Hong Lu, and YueFei Guo. "Region based image retrieval incorporated with camera metadata." Advances in Visual Information Systems: 9th International Conference, Visual 2007 Shanghai, China, Jun. 28-29, 2007 Revised Selected Papers 9. Springer Berlin Heidelberg, 2007. (Year: 2007).*

Espinoza-Molina, Daniela, and Mihai Datcu. "Earth-observation image retrieval based on content, semantics, and metadata." IEEE Transactions on Geoscience and Remote Sensing 51.11 (2013): 5145-5159. (Year: 2013).*

Mattie, Mark E., et al. "PathMaster: content-based cell image retrieval using automated feature extraction." Journal of the American Medical Informatics Association 7.4 (2000): 404-415. (Year: 2000).*

Search Report for EP application 21158624.3, mailed on Aug. 18, 2021.

Search Report for EP application 21158624.3, mailed on Sep. 20, 2024.

* cited by examiner

METHOD FOR PROCESSING IMAGE, RELATED DEVICE AND STORAGE MEDIUM

CROSS-REFERENCE TO RELATED APPLICATIONS

This application claims priority to Chinese Patent Application No. 202010623971.7 filed on Jun. 30, 2020, the disclosure of which is hereby incorporated by reference in its entirety.

BACKGROUND

With the development of electronics technologies, mobile terminals with image capturing functions are becoming more and more popular. Such mobile terminals can include, for example, cameras, smart phones, tablet computers, smart wearable devices, etc. The popularity of terminals with image capturing functions makes it possible for users to take pictures at any time and in any place, making image capturing a part of users' daily lives. For example, when traveling or passing by places of interest, users may want to take pictures for sentimental reasons.

SUMMARY

The present disclosure relates generally to the field of image processing technologies, and more specifically to a method for processing an image, an apparatus for processing an image, and a storage medium.

According to some embodiments of the present disclosure, a method for processing an image is provided. The method includes: obtaining a media image to be processed, in which the media image to be processed has a target scene object at least partially shielded; determining a target shielding object from the media image to be processed, in which the target shielding object at least partially shields the target scene object; and performing image inpainting on a first region of the media image to be processed corresponding to the target shielding object to generate a target media image.

According to embodiments of the present disclosure, a device for image processing is provided. The device includes a processor and a storage device configured to store an instruction executable by the processor. The processor is configured to implement the method for processing the image described above.

According to some embodiments of the present disclosure, a non-transitory computer-readable storage medium is provided. When an instruction in the storage medium is executed by a processor of a mobile terminal, the mobile terminal may implement the method for processing the image described above.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
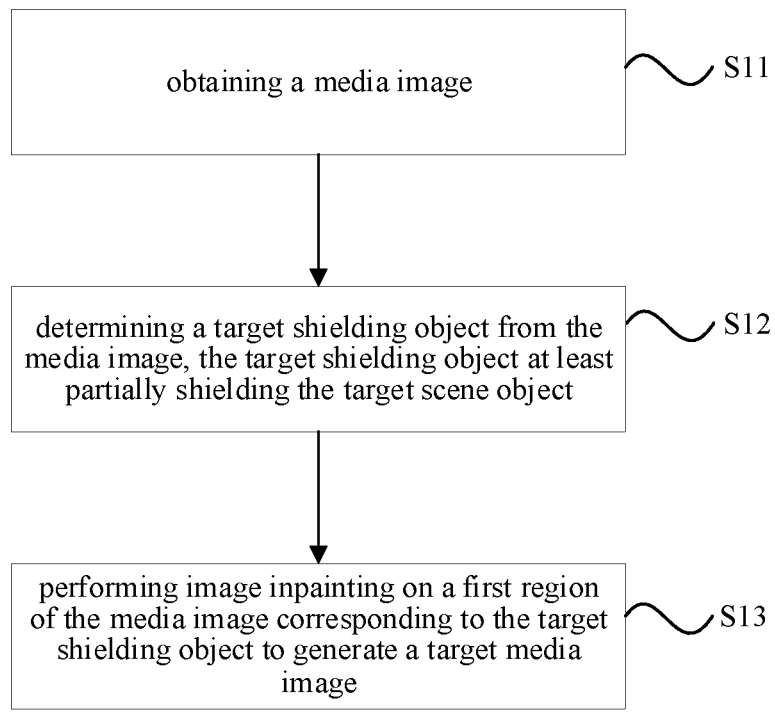
FIG. 1 is a flowchart of a method for processing an image according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the development of terminal technologies, terminals with image capturing functions are becoming more and more popular, such as cameras, smart phones, tablet computers, smart wearable devices, and so on. The popularity of terminals with image capturing functions makes it possible for people to take pictures at any time and in any place, making image capturing a part of people's daily life. In particular, when traveling or passing by places of interest, people want to take pictures for sentimental reasons.

However, scenic spots are usually crowded with tourists, especially in peak seasons. When a user takes a picture in a scenic spot, it is highly likely that irrelevant people will be taken in the picture. In other words, for a picture to be taken by the user or a picture that has been taken, the picture of the field of view includes a main shielding object (for example, a person to be photographed) and shielding objects (for example, other people or objects) other than the main shielding object. Consequently, it is difficult for the user to take a picture with the scenic spot without interference from other people or objects.

A method for processing an image according to embodiments of the present disclosure is applied to a scenario of removing a target shielding object from a media image. The target shielding object at least partially shields a target scene object. For example, the method may be applied to a scenario where objects that shield the background in a certain or some frames of a video need to be removed. As another example, the method may be applied to a scenario where objects that shield the scenery in the field of view of a picture taken at a scenic spot need to be removed.

In the related art, the removal of a background portrait (i.e., the target shielding object) from the background (i.e., the target scene object) in the field of view of a picture taken is usually done through an image processing method, such as a Photoshop (PS) method. For example, at present, in order to obtain a picture of a scenic spot with a user but without others, the user may merge an image of the user and an image of the scenic spot by adopting such as the PS method. In the related art, the removal of the background portrait (i.e., the target shielding object) using the PS method may have the following defects. (1) Good PS skills are needed to obtain a satisfying picture. However, most people are unqualified of good PS skills. (2) The PS method requires a source picture of person and a source picture of background. However, selected source pictures may be poorly matched, and thus an image obtained through the PS method may be unsatisfying. In addition, dynamic adjustments, such as choosing a desired angle, are impossible. (3) Psychologically, the picture obtained through the PS method is fake in some level and lacks commemorative significance compared to a picture actually taken. Therefore, there is a challenge in removing the background portrait from the background in the field of view of the picture taken.

Embodiments of the present disclosure provide a method for processing an image. With the method, the target shielding object is determined from the media image to be processed. The media image to be processed has a target scene object that is at least partially shielded by the target shielding object. Image inpainting is performed on a region corresponding to the target shielding object in the media image to be processed to generate a target media image. In an example, the image inpainting may be performed on regions of objects shielding the background scenery in a real picture taken by the user to obtain a picture without the objects shielding the background scenery. Therefore, a picture that does not have the objects shielding the background scenery and that has the background scenery close to or even same as the real background scenery may be obtained, thereby improving user experience and the degree of satisfaction of the user.

The method for processing the image according to embodiments of the present disclosure may be applied to a terminal. The terminal may be, for example, a mobile terminal with image capturing and processing functions, such as a smart phone and a tablet.

FIG. 1 is a flowchart of a method for processing an image according to some exemplary embodiments. As illustrated in FIG. 1, the method for processing the image may include the following.

At block S11, a media image is obtained. The media image has a target scene object at least partially shielded.

In embodiments of the present disclosure, the term "media image" and the term "media image to be processed" may be exchangeable used. The media image may include an image or a video. The image may be a picture already captured by the user after an image capturing operation or a preview image displayed during the image capturing operation. The video may be already obtained by the user after a video recording operation or a preview video displayed during the video recording operation.

According to embodiments of the present disclosure, the media image includes the target scene object that is at least partially shielded. For example, the target scene object may be a person or scenery to which the user intends to take a picture or record a video. The target scene object may be partially or completely shielded. In embodiments of the present disclosure, an object that partially or completely shields the target scene object may be referred to as a shielding object. A shielding object that is intended to be removed may be referred to as the target shielding object. In some embodiments, the target scene object is partially shielded by the target shielding object.

At block S12, a target shielding object is determined from the media image. The target shielding object at least partially shields the target scene object.

The target shielding object may be various portraits, articles or environments that are irrelevant to the target scene object.

In some embodiments, the media image may be a picture taken at a scenic spot. In addition to the target scene object to which the user intends to take a picture, the picture taken by the user at the scenic spot also includes the target shielding object that is irrelevant to the target scene object and shields the target scene object. The target shielding object may be, for example, another tourist or another object such as a trash can or a tower crane that does not belong the scenery to be captured.

Figure 2A:
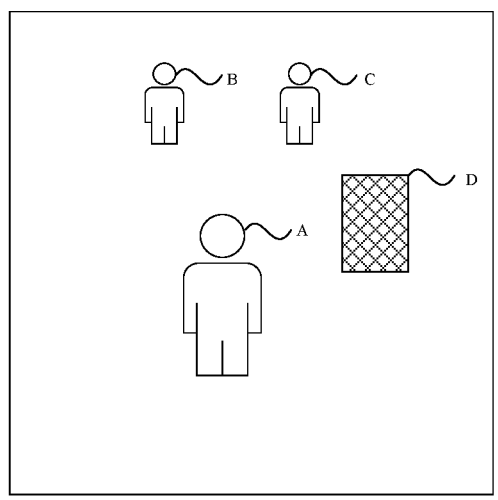
FIG. 2A is a schematic diagram of a picture in which a target scene object is shielded.

In some embodiments, the user is intended to take a scenic picture of the Imperial Palace including a user A. As illustrated in FIG. 2A, in the field of view of the picture taken, besides the target scene object (i.e., the Imperial Palace), there exists tourists B and C that are irrelevant to the user A and a tower crane D that do not belong to the Imperial Palace, shielding the entire view of the Imperial Palace. FIG. 2A illustrates a schematic diagram of a picture in which the target scene object is shielded.

At block S13, image inpainting is performed on a first region of the media image corresponding to the target shielding object, to generate a target media image.

In embodiments of the present disclosure, for the convenience of description, a region of the media image corresponding to the target shielding object may be referred to as the first region.

In some embodiments, there may be one or more target shielding objects. For example, the user wants to take a scenic picture of the Imperial Palace. Since the target shielding objects (e.g., the tourists B and C and the tower crane D) shielding the target scene object (e.g., the Imperial Palace) are already determined, the regions of the scenic picture of the Imperial Palace corresponding to the above target shielding objects may be determined as first regions.

In the field of view of the picture, the first region where the tourist B is located corresponds to for example a window M of the Imperial Palace, the first region where the tourist C is located corresponds to for example a railing N of the Imperial Palace, and the first region where the tower crane D is located corresponds to for example a step W of the Imperial Palace. Consequently, in the picture to be processed, the image inpainting is performed on these first regions to fill the first region corresponding to the tourist B with the window M of the Imperial Palace, to fill the first region corresponding to the tourist C with the railing N of the Imperial Palace, and to fill the first region corresponding to the tower crane D with the step W of the Imperial Palace. The image inpainting is performed on the first regions of the media image, such that the target media image without the target shielding objects may be obtained. That is, a picture of the target scene object (i.e., the Imperial Palace) together with the user A but without the target shielding objects (e.g., the tourist B, the tourist C and the tower crane D) may be obtained.

In embodiments of the present disclosure, the target media image is an image that does not include any target shielding objects but displays an unshielded (or real) target scene object (e.g., the Imperial Palace being not shielded by target shielding objects).

In some embodiments of the present disclosure, before the image inpainting is performed on the first region, removal processing may be performed on the first region. In this manner, a part of the media image within the first region corresponding to the target shielding object may be effectively removed from the media image to obtain a processed media image. In addition, the processed media image is filled with a part of a scene image matching with the first region to obtain a target media image, such that the target media image displays an unshielded (or real) target scene object. That is, the target media image displaying the target scene object close to (or even same as) the real target scene object may be obtained after the target shielding object of the media image to be processed at least partially shielding the target scene object is replaced.

Figure 3:
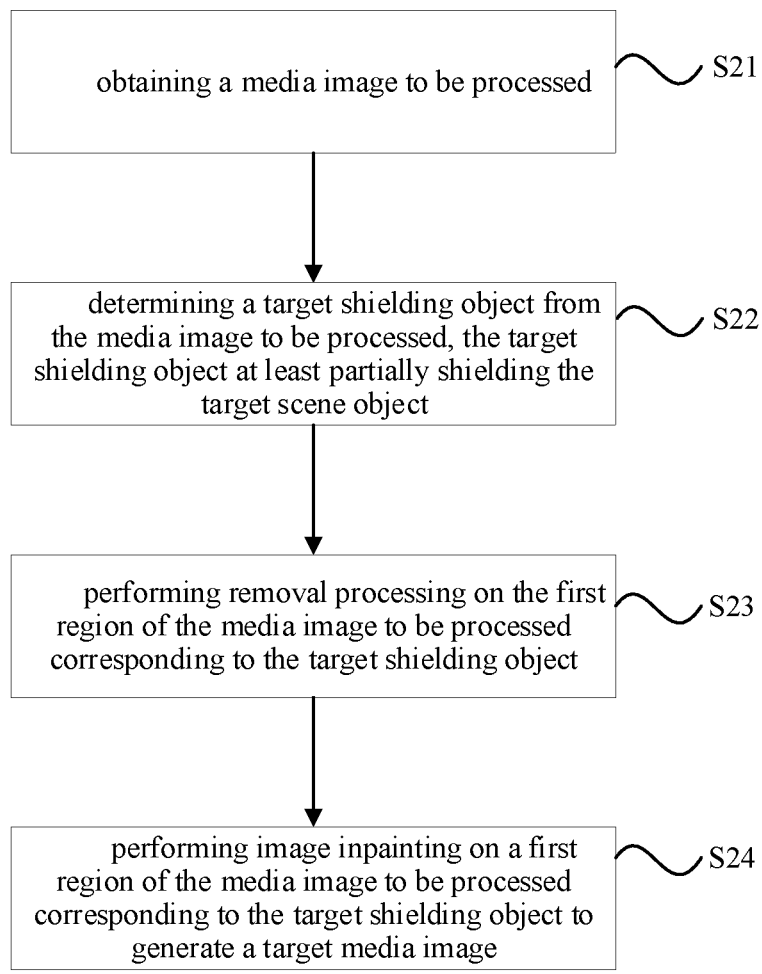
FIG. 3 is a flowchart of a method for processing an image according to some exemplary embodiments.

FIG. 3 is a flowchart of a method for processing an image according to some exemplary embodiments. As illustrated in FIG. 3, in some exemplary embodiments of the present disclosure, the method for processing the image may include the following.

At block S21, a media image is obtained. The media image has a target scene object at least partially shielded.

At block S22, target shielding objects are determined from the media image. The target shielding objects at least partially shield the target scene object.

At block S23, removal processing is performed on first regions of the media image corresponding to the target shielding objects.

In embodiments of the present disclosure, performing the removal processing on the first regions means removing some parts of media image corresponding to the first regions from the media image, i.e., keeping other parts of the media image corresponding to the target scene object that is not shielded by the target shielding objects left. In some embodiments, the media image is a picture. After parts of the picture within the first regions corresponding to the target shielding objects are removed, a picture displaying unshielded parts of the target scene object and blank regions is obtained.

Figure 2B:
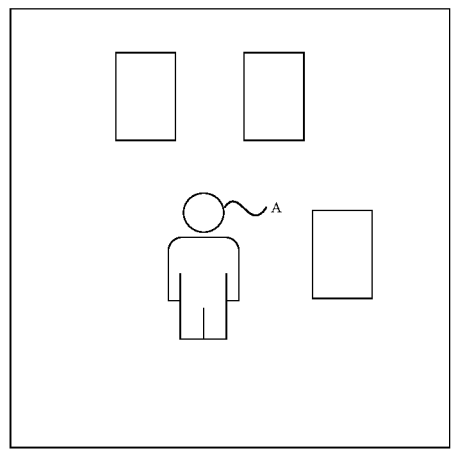
FIG. 2B is a schematic diagram of a picture in which first regions corresponding to target shielding objects are removed.

In embodiments of the present disclosure, for example, the user wants to take a scenic picture of the Imperial Palace. With the method for processing the image according to embodiments of the present disclosure, after the picture is taken, the target scene object (e.g., the Imperial Palace), the tourist B, the tourist C, and the tower crane D are recognized. After parts of the picture within the first regions respectively corresponding to the tourist B, the tourist C and the tower crane D are removed from the picture to be processed, a picture displaying unshielded portions of the target scene object (e.g., remaining parts of the Imperial Palace) and three blank regions corresponding to the first regions of the tourist B, the tourist C and the tower crane D is obtained, as illustrated in FIG. 2B. FIG. 2B illustrates a schematic diagram of a picture in which parts of pictures within the first regions corresponding to the target shielding objects are removed.

At block S24, image inpainting is performed on first regions of the media image corresponding to the target shielding objects to generate a target media image.

In an implementation of the present disclosure, scene images matching the target scene object may be stored in a cloud database, such that a scene image displaying the target scene object and used to fill the first region may be obtained from the cloud database.

Figure 4:
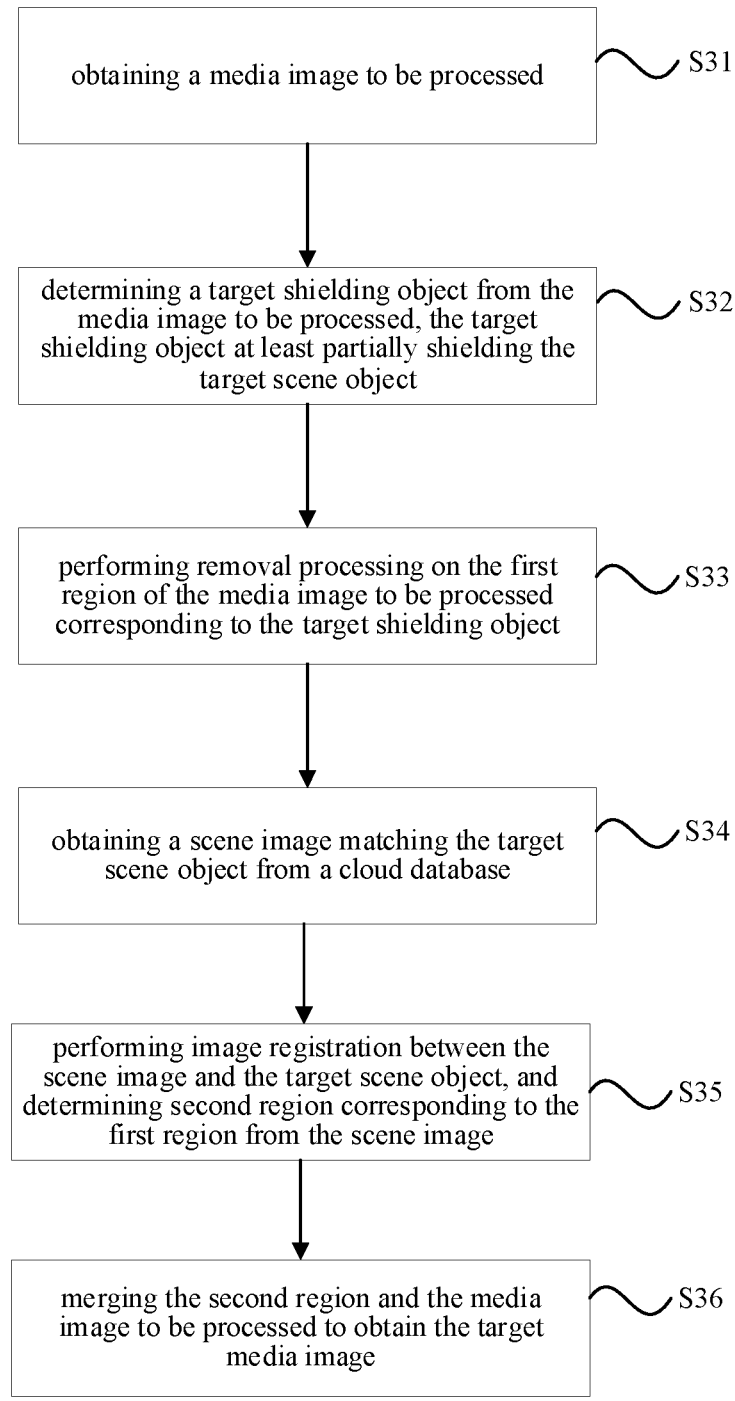
FIG. 4 is a flowchart of a method for processing an image according to some exemplary embodiments.

FIG. 4 is a flowchart of a method for processing an image according to some exemplary embodiments. As illustrated in FIG. 4, in some exemplary embodiments of the present disclosure, the method for processing the image may include the following.

At block S31, a media image is obtained. The media image has a target scene object at least partially shielded.

At block S32, one or more target shielding objects are determined from the media image. The one or more target shielding objects at least partially shield the target scene object.

At block S33, removal processing is performed on one or more first regions of the media image corresponding to the one or more target shielding objects.

At block S34, a scene image matching the target scene object is obtained from a cloud database.

In embodiments of the present disclosure, the cloud database includes various scene images.

In some embodiments, the scene images may be pre-stored in the cloud database. The scene image may be an image without any people or unrelated objects, for example, a pure background image. That is, the scene image displays only the target scene object. Pure background images stored in the cloud database may be updated in real time or at intervals to ensure the comprehensiveness and timeliness of the scene images stored in the cloud database.

In an implementation, if the method for processing the image according to embodiments of the present disclosure is applied to a scenario of obtaining the scene image, the cloud database may work in cooperation with management departments of the scenic spots to obtain scene images of different scenic spots timely to maintain images of the cloud database. The scene images included in the cloud database may include scene images of different scenic spots at different times, locations and perspectives.

In some embodiments, as an example, the cloud database has scene images about the Imperial Palace stored thereon. The cloud database may include scene images of the Imperial Palace captured in different seasons such as early spring, late spring, early summer, late summer, early autumn, late autumn, early winter and late winter, scene images of the Imperial Palace captured in different time periods of a day such as morning, noon, and evening, scene images of the Imperial Palace captured under different weather conditions such as sunny, cloudy, rainy, and snowy, and scene images of the Imperial Palace captured in different directions such as east, west, south, and north, or the combination thereof.

In embodiments of the present disclosure, since the cloud database includes scene images of various scenic spots in different conditions or states, an image matching method in the related art may be adopted to find a scene image matching the target scene object from the cloud database.

At block S35, image registration is performed between the scene image and the target scene object. A second region corresponding to the first region is determined from the scene image.

In embodiments of the present disclosure, the image registration is performed between the scene image matching the target scene object and the target scene object within the first region to determine a region (hereinafter referred to as the second region) of the scene image corresponding to the first region. The processed media image that is obtained after the part of the media image within the first region is removed is filled with the part of the scene image within second region to realize the image inpainting of real target scene object, thereby obtaining the target media image with a real effect.

In embodiments of the present disclosure, for example, the user wants to take a scenic picture of the Imperial Palace. After the scene image Q matching the target scene object contained in the picture taken by the user is found out, the image registration is performed between the scene image Q and the target scene object, and the second region of the scene image Q corresponding to the first region is determined.

Figure 2C:
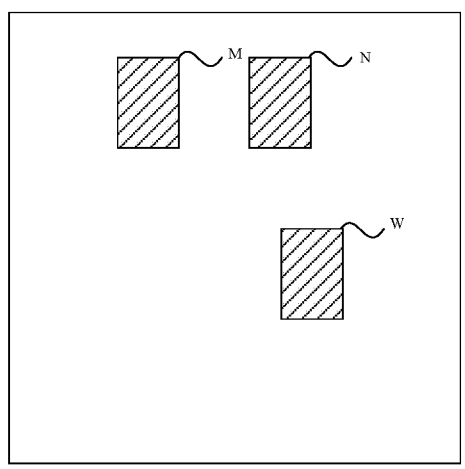
FIG. 2C is a schematic diagram of a scene image matching the target scene object.

The first region of the tourist B corresponds to for example the window M of the Imperial Palace, the first region of the tourist C corresponds to for example the railing N of the Imperial Palace, and the first region of the tower crane D corresponds to for example the step W of the Imperial Palace. After the image registration is performed between the scene image Q and the target scene object, it may be determined that the region of the window M of the scene image Q is the second region corresponding to the first region of the tourist B, the region of the railing N of the scene image Q is the second region corresponding to the first region of the tourist C, and the region of the step W of the scene image Q is the second region corresponding to the first region of the tower crane D. FIG. 2C illustrates a schematic diagram of a scene image matching the target scene object.

The scene image is a pure background image without any people or unrelated objects, that is actually captured and matches the target scene object. Performing, based on the part of the scene image within the second region, the image inpainting of the target scene object on the processed media image that is obtained after the part of the media image within the first region is removed can ensure that the target media image has a good realistic effect to a large extent.

At block S36, the second region and the media image are merged to obtain the target media image.

In an implementation, in a case where the part of the media image within the first region is not removed from the media image, merging the second region and the media image may include replacing the part of media image within the first region with a part of the scene image within the second region. In another implementation, for a case where the part of the media image within the first region is removed from the media image, merging the second region and the media image may including filling the part of the scene image within the second region to the first region of the media image to obtain the target media image.

Figure 2D:
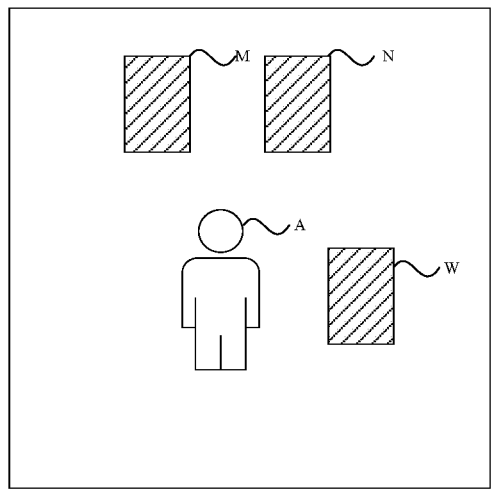
FIG. 2D is a schematic diagram of performing image inpainting of the target scene object on a media image to be processed with the first regions removed.

In embodiments of the present disclosure, for example, the user wants to take a scenic picture of the Imperial Palace. FIG. 2D illustrates a schematic diagram of performing image inpainting of the target scene object on the processed media image that the parts of the media image within the first regions are removed. For example, as illustrated in FIG. 2D, the target media image obtained contains the unshielded target scene object, such as the Imperial Palace having the window M, the railing N and the step W, (the pure background image of the Imperial Palace without any shielding objects).

Embodiments of the present disclosure describe the process of obtaining the scene image matching the target scene object from the cloud database in combination with practical applications.

Figure 5:
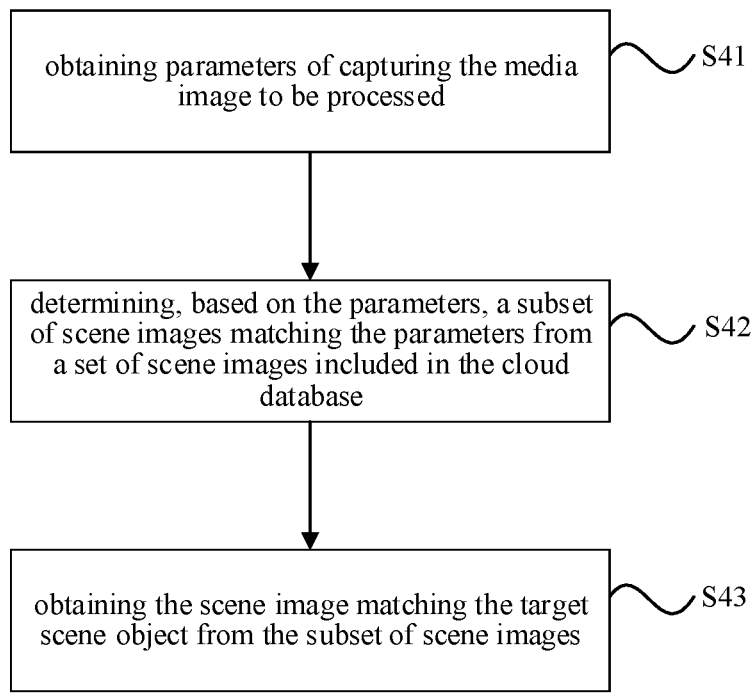
FIG. 5 is a flowchart of obtaining a scene image matching a target scene object from a cloud database according to some exemplary embodiments.

FIG. 5 is a flowchart of obtaining a scene image matching a target scene object from a cloud database according to some exemplary embodiments.

As illustrated in FIG. 5, in some exemplary embodiments of the present disclosure, obtaining the scene image matching the target scene object from the cloud database may include the following.

At block S41, parameters of capturing the media image are obtained.

Different parameters will result in different images of the same scene. Therefore, the parameters will affect scene images matching the target scene object.

For example, the user desires to take a picture of the Imperial Palace. Scene images related to the Imperial Palace without any person or other unrelated objects may be obtained on the basis of locations of capturing images, including for example images of the main hall of the Imperial Palace, the side hall of the Imperial Palace, the square of the Imperial Palace, and roofs of buildings of the Imperial Palace. Also, scene images related to the Imperial Palace without any person or other unrelated objects may be obtained on the basis of orientations of capturing images, including for example eastward, southward, westward and northward images of the Imperial Palace. Also, scene images related to the Imperial Palace without any person or other unrelated objects may be obtained on the basis of angles of capturing images, including for example images of the Imperial Palace captured based on an elevation angle, a depression angle, a flat angle, and an angle of a panoramic view. Also, scene images related to the Imperial Palace without any person or other unrelated objects may be obtained on the basis of season information of capturing images, including for example images of the Imperial Palace captured in spring, summer, autumn, and winter. Also, scene images related to the Imperial Palace without any person or other unrelated objects may be obtained on the basis of weather information of capturing images, including for example images of the Imperial Palace captured in a sunny day, a cloudy day, a rainy day, and a snowy day.

The parameters of capturing the media image may be determined based on practical conditions. For example, the parameters include one or more of illuminance information of capturing the media image, time information of capturing the media image, location information of capturing the media image, orientation information of capturing the media image, angle information of capturing the media image, season information of capturing the media image, and weather information of capturing the media image. In the present disclosure, the parameters are not limited.

In embodiments of the present disclosure, depending on types of the parameters, different manners may be adopted to obtain the parameters of capturing the media image. For example, the time information of capturing the media image, the illuminance information of capturing the media image, and the location information of capturing the media image may be directly obtained from capturing parameter attributes of the media image. The orientation information of capturing the media image may be determined based on location information. For example, the orientation information of capturing the media image may be determined based on longitude and latitude coordinates of the location of capturing the media image and longitude and latitude coordinates of the scene captured by the user. The season information of capturing the media image and the weather information of capturing the media image may be queried via the network based on time and location of capturing the media image.

In some example, the parameters of capturing the media image may be recorded and stored during the process of capturing the media image, and may be obtained from a storage medium. For example, the media image to be processed may be a picture that is captured after the image capturing operation or a video that is recorded after the video recording operation. The parameters of capturing the image or recording the video may be stored in the storage medium, such that the parameters of capturing the media image or the parameters of recording the video may be directly obtained from the storage medium.

At block S42, a subset of scene images matching the parameters is determined based on the parameters from a set of scene images included in the cloud database.

With the advent of the 5th-Generation (5G) era, the process of determining, based on the parameters, the subset of scene images matching the parameters from the set of scene images included in the cloud database will take little time, thereby providing the foundation for fast and accurate obtaining of the scene image matching the target scene object.

In embodiments of the present disclosure, the set of scene images without any people or unrelated objects may be roughly filtered in the cloud database to narrow a range of scene images matching the target scene object. In embodiments of the present disclosure, the scene images determined based on the parameters from the set of scene images included in the cloud database are referred to as the subset of scene images.

In some embodiments, for example the user captures an image including the user A in a due south direction of the Imperial Palace in the morning of early spring. It may be determined that an object captured by the user is the Imperial Palace, the season of capturing the image is the early spring, the time of capturing the image is the morning, and the orientation of capturing the image is the due south direction. In the present disclosure, the subset of scene images matching the image captured may be determined from the cloud database based on the parameters of the image. The subset of scene images may be understood as several scene images satisfying that the season of image capturing is the early spring, the time of image capturing is the morning, and the orientation of image capturing is the due south direction.

In applications, the user may enter the object to be captured and the parameters of capturing the image into a search box of keywords to find the scene images satisfying limitations of both the object to be captured and the parameters. In some embodiments, searched items related to such as the Imperial Palace may be searched for based on the object to be captured, and then the scene images matching the parameters may be found from the searched items.

With the above manner, scene images (i.e., the subset of scene images) matching the target scene object may be found quickly.

At block S43, the scene image matching the target scene object is obtained from the subset of scene images.

On the basis of the subset of scene images, the scene image that best matches the target scene object may be determined from the subset of scene images.

The present disclosure will describe the process of obtaining the scene image matching the target scene object from the subset of scene images in combination with the following embodiments.

In embodiments of the present disclosure, the media image may include other scene objects besides the target scene object. For example, the shielding objects that shield the target scene object of the media image may include a main shielding object. The main shielding object may be understood as a shielding object that is intended to be retained in the media image. For example, a portrait that is intended to be included in the picture may be understood as the main shielding object that shields the target scene object.

In embodiments of the present disclosure, in terms of obtaining the scene image matching the target scene object, a feature matching weight may be zeroed for each scene object other than the target scene object in the media image, and a scene image having a highest matching degree with the target scene object may be determined from the subset of scene images as the scene image matching the target scene object.

Scene images are matched with a part of the media image without any people or unrelated objects to obtain the scene image matching the media image. Consequently, when calculating the matching degree between features of the media image and features of each scene image, the feature matching weight may be zeroed for other scene objects besides the target scene object in the media image. That is, it may be understood that the features of the target scene object in the media image may be determined as features of the media image. Further, the scene image having the highest matching degree with the media image may be determined based on the manner of feature matching as the scene image matching the target scene object.

In embodiments of the present disclosure, other manners may be adapted to perform the image inpainting of the real target scene object on the first region of the media image to generate the target media image.

In some embodiments, with the big data learning technique, the target media image may be generated to include real target scene object in a manner of performing the image inpainting on the first region of the media image. In some embodiments, with the big data learning technique, the part of the media image within the first region is not removed. Instead, the image inpainting is directly performed on the first region of the media image such that the target shielding object of the media image shielding the target scene object is replaced by the image of the real target scene object, to generate the target media image.

In some embodiments of the present disclosure, explanation will be made by taking an example of performing, based on a pre-trained neural network model, image restoration on the first region of the media image corresponding to the target shielding object to generate the target media image.

Performing the image inpainting on the first region of the media image corresponding to the target shielding object to generate the target media image may include the following.

Based on the pre-trained neural network model, the image restoration is performed on the first region of the media image corresponding to the target shielding object to generate the target media image.

In embodiments of the present disclosure, on the basis of the image restoration technology based on the deep learning, the image restoration may be performed on the first region of the media image corresponding to the target shielding object to generate the target media image.

In applications, on the basis of the pre-trained neural network model, the image restoration may be directly performed on the first region of the media image corresponding to the target shielding object to generate the target media image.

In some embodiments of the present disclosure, in a case where no cloud database exists, or in a case where no scene image matching the target scene object is found in the cloud database, the image restoration may be performed on the first region of the media image corresponding to the target shielding object on the basis of the image restoration technology based on the deep learning.

Certainly, it may be understood that in embodiments of the present disclosure, the implementation of performing the image restoration on the first region of the media image corresponding to the target shielding object on the basis of the image restoration technology based on the deep learning may be used in combination with the foregoing embodiments, or used separately. For both implementations used separately or in combination with the foregoing embodiments, principles are similar. In implementations of the present disclosure, some embodiments are described in combination with the foregoing embodiments. A person skilled in the art may understand that such descriptions are not intended to limit embodiments of the present disclosure.

Below, the process of determining the target shielding object that shields the target scene object in the media image will be described in embodiments of the present disclosure.

Figure 6:
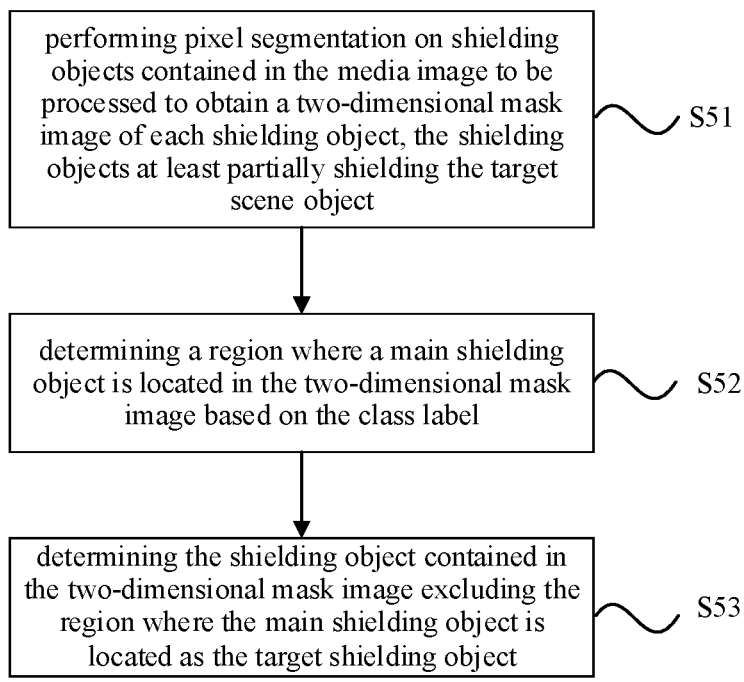
FIG. 6 is a flowchart of determining a target shielding object that shields a target scene object in a media image to be processed according to some exemplary embodiments.

FIG. 6 is a flowchart of determining a target shielding object that shields a target scene object in a media image to be processed according to some exemplary embodiments. In some example, there may be two or more target shielding objects.

As illustrated in FIG. 6, in exemplary embodiments of the present disclosure, determining the target shielding object that shields the target scene object in the media image to be processed may include the following.

At block S51, pixel segmentation is performed on shielding objects contained in the media image to obtain a two-dimensional mask image of the shielding objects. The shielding objects at least partially shield the target scene object. A region where each shielding object is located in the two-dimensional mask image corresponds to a class label.

The target scene object and the shielding objects are recognized from the media image. The shielding objects and the target scene object may be distinguished from each other. The pixel segmentation is performed on the shielding objects recognized to obtain regions of the shielding objects at a pixel level. In some embodiments, performing the pixel segmentation on the shielding objects may obtain the two-dimensional mask image of the shielding objects. In the two-dimensional mask image, the region where each shielding object is located has the class label corresponding thereto.

The shielding objects recognized include not only the target shielding object but also the main shielding object. The main shielding object may be a portrait of a main person in the media image. For the media image, the main shielding object may be a shielding object that needs to be retained in the target media image, while the target shielding object may be a shielding object that needs to be removed from the media image.

In some embodiments, the segmentation of the regions of the shielding objects may be implemented based on a convolutional neural network (CNN).

The segmentation at the pixel level may be performed based on the shielding objects recognized to obtain different regions of the shielding objects, and different regions of the shielding objects correspond to different class labels. The class labels may be identifiers representing different regions of the shielding objects, that is, a region of each shielding object corresponds to a class label. For example, the region of the main shielding object corresponds to the class label of the region of the main shielding object, and the region of the target shielding object corresponds to the class label of the region of the target shielding object.

At block S52, a region where a main shielding object is located in the two-dimensional mask image is determined based on the class label.

Since the regions of the shielding objects correspond to the class labels, the region where the main shielding object is located may be determined based on the class label.

At block S53, the shielding object contained in the two-dimensional mask image excluding the region where the main shielding object is located is determined as the target shielding object.

In some exemplary embodiments of the present disclosure, determining the region wherein the main shielding object is located in the two-dimensional mask image based on the class label may include the following.

In some embodiments, a region of pixels corresponding to a class label of the main shielding object is determined as the region where the main shielding object is located based on a convolutional neural network, that is, the region where the main shielding object is located in the media image to be processed is automatically detected and recommended based on the convolutional neural network and the class label.

In some embodiments, a region of pixels corresponding to a class label selected by a user may be determined as the region where the main shielding object is located. That is, regions of shielding objects corresponding to some kinds of class labels may be manually determined as regions where main shielding objects are located, and regions of shielding objects corresponding to some kinds of class labels may be manually determined as regions where target shielding objects are located.

In some embodiments, regions where first main shielding objects are located in the media image may be automatically detected and recommended based on the convolutional neural network and the class label. After manual correction, the region where the main shielding object is located may be further determined from the regions where the first main shielding objects are located.

Figure 7:
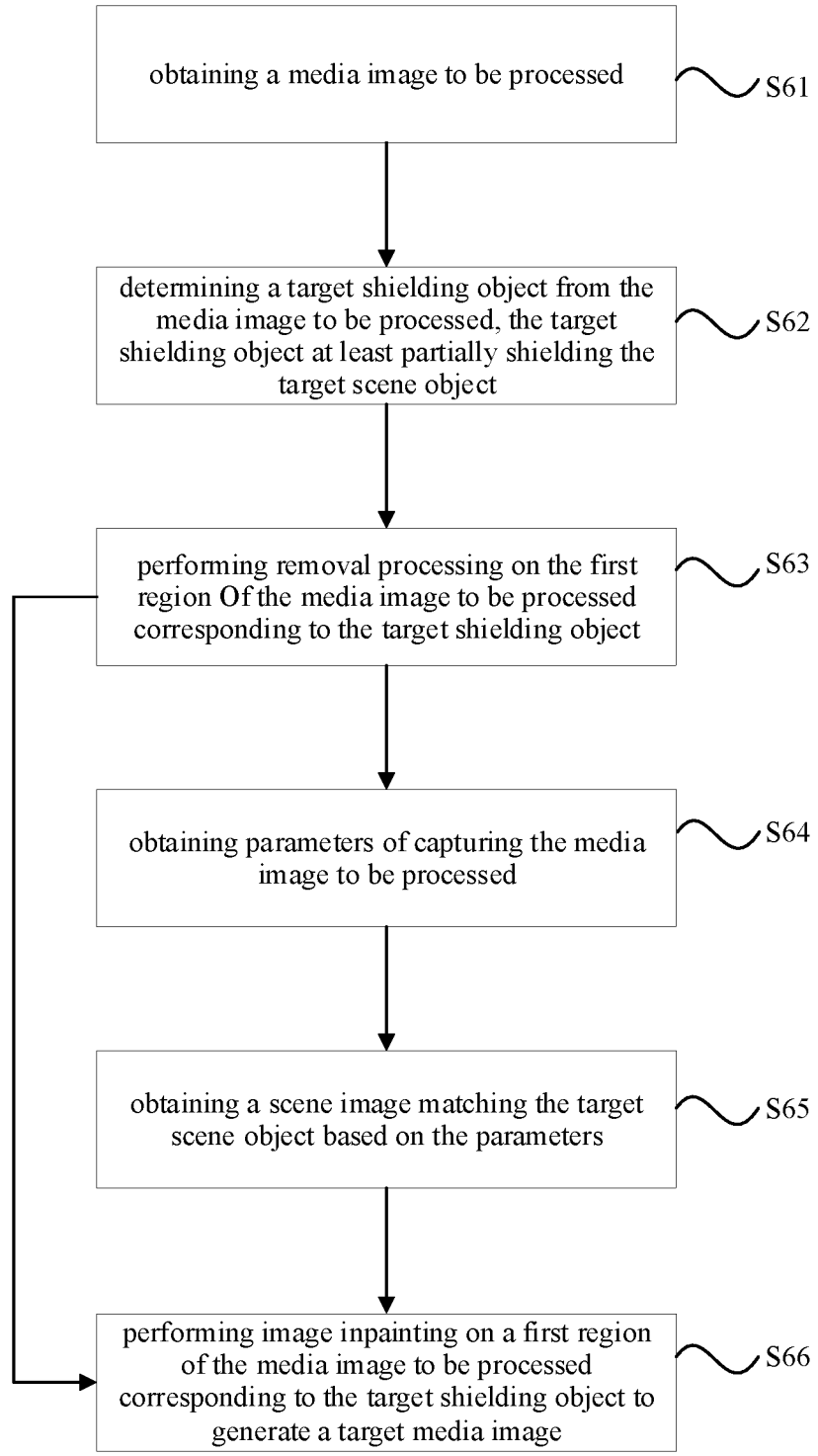
FIG. 7 is a schematic diagram of a method for processing an image according to some exemplary embodiments.

On the basis of the method for processing the image according to the foregoing embodiments of the present disclosure, FIG. 7 is a schematic diagram of a method for processing an image according to some exemplary embodiments.

As illustrated in FIG. 7, in some exemplary embodiments of the present disclosure, the method for processing the image may include the following.

At block S61, a media image is obtained.

The media image is obtained. The media image has a target scene object at least partially shielded by shielding objects. The shielding objects shielding the target scene object may include the target shielding object and the main shielding object.

At block S62, a target shielding object is determined from the media image. The target shielding object at least partially shields the target scene object.

In some embodiments, regions of the shielding objects in the media image to be processed may be segmented based on a segmentation technology, such as the convolutional neural network, to obtain a region (i.e., the first region) where the target shielding object is located and the region where the main shielding object is located.

At block S63, removal processing is performed on the first region corresponding to the target shielding object in the media image to be processed.

Performing the removal processing on the first region of the media image corresponding to the target shielding object may be understood as obtaining the processed media image having the target scene object whose part corresponding to the main shielding object is retained and whose part corresponding to the target shielding object is removed. That is, an image having blank parts and unshielded parts of the target scene objects is obtained. The blank parts of the image correspond to the removed first region corresponding to the target shielding object.

At block S64, parameters of capturing the media image are obtained.

The parameters include one or more of illuminance information of capturing the media image, time information of capturing the media image, location information of capturing the media image, orientation information of capturing the media image, angle information of capturing the media image, season information of capturing the media image, and weather information of capturing the media image.

At block S65, a scene image matching the target scene object is obtained based on the parameters.

In embodiments of the present disclosure, on the basis of the parameters, scene images matching the parameters may be searched for from the cloud database.

In applications, the object to be captured and the parameters may be entered into a search box of keywords to find scene images matching both the object to be captured and the parameters. In some embodiments, searched items related to such as the Imperial Palace may be searched for based on the object to be captured, and then, the scene images matching the parameters may be searched for under the searched items. A scene image that best matches the target scene object is determined from the scene images.

Further, a feature matching weight may be zeroed for each scene object other than the target scene object in the media image. A scene image having a highest matching degree with the target scene object may be determined from the subset of scene images as the scene image matching the target scene object.

At block S66, image inpainting is performed on the first region of the media image corresponding to the target shielding object to generate a target media image.

In some embodiments, if a scene image matching the target scene object exists in the cloud database, the scene image matching the target scene object is obtained based on the parameters. Image registration is performed between the scene image and the target scene object, and a second region corresponding to the first region is determined from the scene image. The second region and the media image to be processed are merged to obtain the target media image. In this manner, joints of the target media image after the merging are smooth, and the overall effect of the target media image is real, natural and fascinating.

In some embodiments, if no scene image matching the target scene object exists in the cloud database, the image restoration technology based on the deep learning may be adapted to perform the image inpainting on the first region of the media image corresponding to the target shielding object to generate the target media image.

It may be seen from the above description that, with the method for processing the image, the first region of the media image corresponding to the target shielding object may be effectively removed. In addition, the filling of the second region matching the first region may realize image inpainting of the real target scene object on the media image to be processed whose first region is removed, and guarantee the authenticity of the target scene object in the media image to be processed, thereby ensuring that the user obtains a media image to be processed in which the target shielding object at least partially shielding the target scene object is removed and that is close to the real target scene object.

On the basis of the same concept, embodiments of the present disclosure provide an apparatus for processing an image.

It may be understood that, in order to implement the above functions, the apparatus for processing the image according to embodiments of the present disclosure includes hardware structures and/or software modules corresponding to performing each function. In combination with units and algorithm steps of examples disclosed in embodiments of the present disclosure, embodiments of the present disclosure may be implemented in the form of hardware or a combination of hardware and computer software. Whether a certain function is executed by hardware or in a manner of driving hardware by computer software depends on specific applications and design constraints of the technical solution. A person skilled in the art may adopt different methods for each specific application to implement the described functions, but such implementation should not be considered as going beyond the scope of the technical solution of embodiments of the present disclosure.

Figure 8:
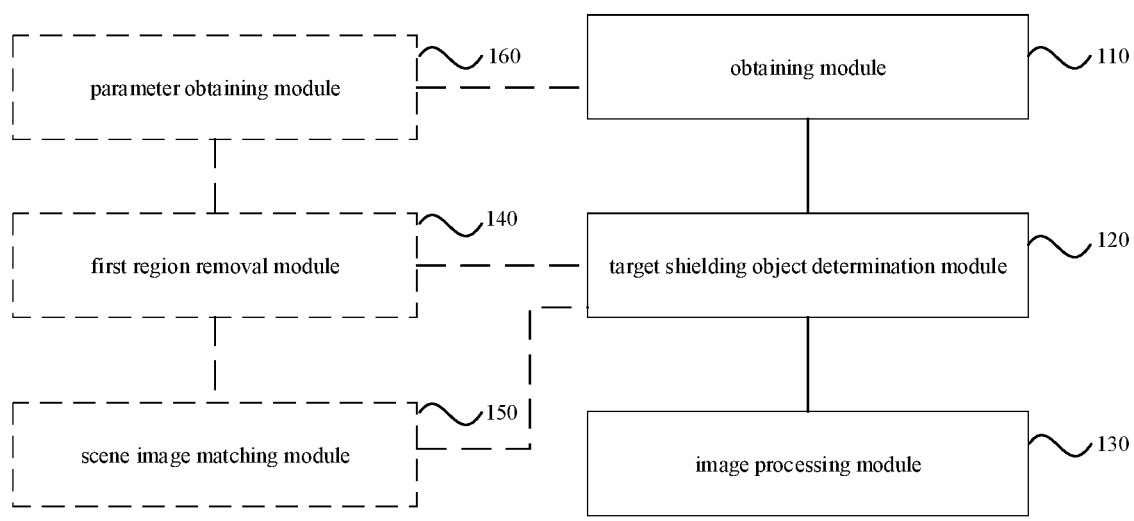
FIG. 8 is a block diagram of an apparatus for processing an image according to some exemplary embodiments.

FIG. 8 is a block diagram of an apparatus for processing an image according to some exemplary embodiments.

In some exemplary embodiments of the present disclosure, as illustrated in FIG. 8, the apparatus for processing the image includes an obtaining module 110, a target shielding object determination module 120, and an image processing module 130. Each module will be described below.

The obtaining module 110 is configured to obtain a media image to be processed. The media image to be processed has a target scene object at least partially shielded.

The target shielding object determination module 120 is configured to determine a target shielding object from the media image to be processed. The target shielding object at least partially shields the target scene object.

The image processing module 130 is configured to perform image inpainting on a first region of the media image to be processed corresponding to the target shielding object to generate a target media image.

In some exemplary embodiments of the present disclosure, the apparatus for processing the image further includes a first region removal module 140. The first region removal module 140 is configured to perform removal processing on the first region of the media image to be processed corresponding to the target shielding object.

In some exemplary embodiments of the present disclosure, the apparatus for processing the image further includes a scene image matching module 150. The scene image matching module 150 is configured to obtain from a cloud database a scene image matching the target scene object. The image processing module is configured to: perform image registration between the scene image and the target scene object, and determine a second region corresponding to the first region from the scene image; and merge the second region and the media image to be processed to obtain the target media image.

In some exemplary embodiments of the present disclosure, the apparatus for processing the image further includes a parameter obtaining module 160. The parameter obtaining module 160 is configured to obtain parameters of capturing the media image to be processed. The parameters include one or more of illuminance information of capturing the media image, time information of capturing the media image, location information of capturing the media image, orientation information of capturing the media image, angle information of capturing the media image, season information of capturing the media image, and weather information of capturing the media image. The scene image matching module 150 is configured to: determine, based on the parameters, a subset of scene images matching the parameters from a set of scene images included in the cloud database; and obtain the scene image matching the target scene object from the subset of scene images.

In some exemplary embodiments of the present disclosure, the scene image matching module 150 is configured to zero a feature matching weight for each scene object other than the target scene object in the media image to be processed, and to determine a scene image having a highest matching degree with the target scene object from the subset of scene images as the scene image matching the target scene object.

In some exemplary embodiments of the present disclosure, the image processing module 130 is configured to perform, based on a pre-trained neural network model, image restoration on the first region of the media image to be processed corresponding to the target shielding object to generate the target media image.

In some exemplary embodiments of the present disclosure, the target shielding object determination module 120 is configured to: perform pixel segmentation on shielding objects contained in the media image to be processed, to obtain a two-dimensional mask image of the shielding objects, in which the shielding objects at least partially shield the target scene object, and a region where each shielding object is located in the two-dimensional mask image corresponds to a class label; determine a region where a main shielding object is located in the two-dimensional mask image based on the class label; and determine the shielding object contained in the two-dimensional mask image excluding the region where the main shielding object is located as the target shielding object.

In some exemplary embodiments of the present disclosure, the target shielding object determination module 120 is configured to: determine, based on a convolutional neural network, a region of pixels corresponding to a class label of the main shielding object as the region where the main shielding object is located; or determine a region of pixels corresponding to a class label selected by a user as the region where the main shielding object is located.

Regarding the apparatus according to the above embodiments, the specific manner of performing operations by each module of the apparatus has been described in detail in embodiments of the method, and thus repeated description will be omitted here.

Figure 9:
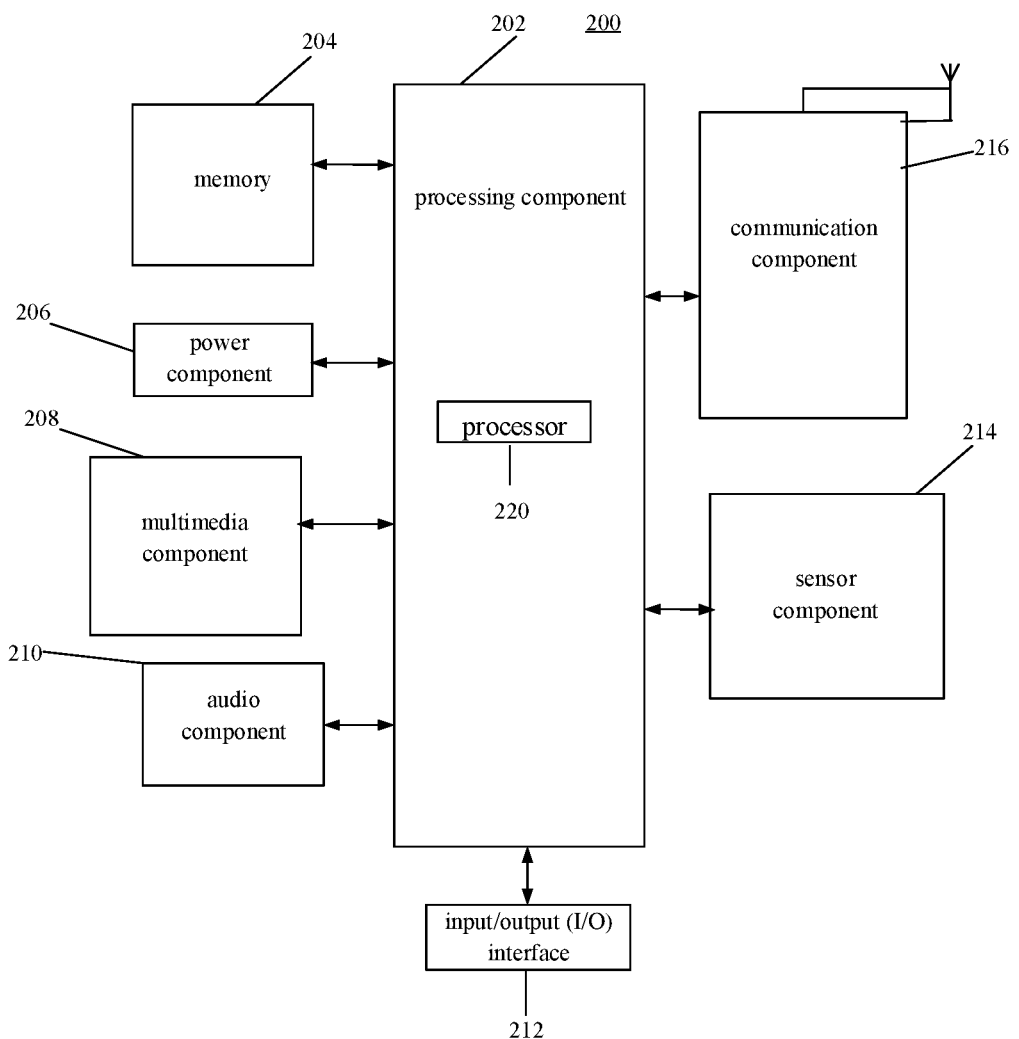
FIG. 9 is a block diagram of a device for image processing according to some exemplary embodiments.

FIG. 9 is a block diagram of a device for image processing according to some exemplary embodiments. For example, the device 200 for image processing may be a mobile phone, a computer, a digital broadcast terminal, a messaging device, a game console, a tablet device, a medical device, an exercise device, a personal digital assistant, and so on.

Referring to FIG. 9, the device 200 for image processing may include one or more of the following components: a processing component 202, a memory 204, a power component 206, a multimedia component 208, an audio component 210, an input/output (I/O) interface 212, a sensor component 214, and a communication component 216.

The processing component 202 normally controls the overall operation (such as operations associated with displaying, telephone calls, data communications, camera operations and recording operations) of the device 200 for image processing. The processing component 202 may include one or a plurality of processors 220 to execute instructions so as to perform all or part of the steps of the above described method. In addition, the processing component 202 may include one or a plurality of units to facilitate interactions between the processing component 202 and other components. For example, the processing component 202 may include a multimedia unit to facilitate interactions between the multimedia component 208 and the processing component 202.

The memory 204 is configured to store various types of data to support operations at the device 200 for image processing. Examples of such data include instructions for any application or method operated on the device 200 for image processing, contact data, phone book data, messages, images, videos and the like. The memory 204 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 206 provides power to various components of the device 200 for image processing. The power component 206 may include a power management system, one or a plurality of power sources and other components associated with power generation, management, and distribution of the device 200 for image processing.

The multimedia component 208 includes a screen that provides an output interface between the device 200 for image processing and the user. In some embodiments, the screen may include a liquid crystal display (LCD) and a touch panel (TP). In some embodiments, an organic light-emitting diode (OLED) display screen can be adopted.

If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 208 includes a front camera and/or a rear camera. When the device 200 for image processing is in an operation mode such as a shooting mode or a video mode, the front camera and/or the rear camera may receive external multimedia data. Each front camera and rear camera may be a fixed optical lens system or have a focal length and an optical zoom capability.

The audio component 210 is configured to output and/or input an audio signal. For example, the audio component 210 includes a microphone (MIC) that is configured to receive an external audio signal when the device 200 for image processing is in an operation mode such as a call mode, a recording mode, and a voice recognition mode. The received audio signal may be further stored in the memory 204 or transmitted via the communication component 216. In some embodiments, the audio component 210 further includes a speaker for outputting audio signals.

The I/O interface 212 provides an interface between the processing component 202 and a peripheral interface unit. The peripheral interface unit may be a keyboard, a click wheel, a button and so on. These buttons may include, but are not limited to, a home button, a volume button, a start button, and a locking button.

The sensor assembly 214 includes one or a plurality of sensors for providing the device 200 for image processing with various aspects of status assessments. For example, the sensor component 214 may detect an ON/OFF state of the device 200 for image processing and a relative positioning of the components. For example, the components may be a display and a keypad of the device 200 for image processing. The sensor component 214 may also detect a change in position of the device 200 for image processing or a component of the device 200 for image processing, the presence or absence of contact of the user with the device 200 for image processing, the orientation or acceleration/deceleration of the device 200 for image processing and a temperature change of the device 200 for image processing. The sensor component 214 may include a proximity sensor configured to detect the presence of nearby objects without any physical contact. The sensor component 214 may also include a light sensor (such as a CMOS or a CCD image sensor) for use in imaging applications. In some embodiments, the sensor component 214 may further include an acceleration sensor, a gyro sensor, a magnetic sensor, a pressure sensor, or a temperature sensor.

The communication component 216 is configured to facilitate wired or wireless communication between the device 200 for image processing and other devices. The device 200 for image processing may access a wireless network based on a communication standard such as Wi-Fi, 2G, 4G, 4G, or 5G, or a combination thereof. In some exemplary embodiments, the communication component 216 receives broadcast signals or broadcast-associated information from an external broadcast management system via a broadcast channel. In some exemplary embodiments, the communication component 216 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In some exemplary embodiments, the device 200 for image processing may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above method.

In some exemplary embodiments, there is also provided a non-transitory computer readable storage medium including instructions, such as a memory 204 including instructions. The instructions are executable by the processor 220 of the device 200 for image processing to perform the above method. For example, the non-transitory computer readable storage medium may be a ROM, a random-access memory (RAM), a CD-ROM, a magnetic tape, a floppy disk, an optical data storage device, etc.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

It may be further understood that terms "first", "second", etc. are used to describe various types of information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, first information may also be referred to as second information, and similarly, the second information may also be referred to as the first information.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An image processing method, comprising:
   obtaining a media image, the media image having a target scene object at least partially shielded;
   determining a target shielding object from the media image, the target shielding object at least partially shielding the target scene object;
   performing image inpainting on a first region of the media image corresponding to the target shielding object to generate a target media image;
   obtaining parameters of capturing the media image, the parameters comprising at least two of time information of capturing the media image, location information of capturing the media image, orientation information of capturing the media image, season information of capturing the media image, illuminance information of capturing the media image, angle information of capturing the media image, and weather information of capturing the media image;
   determining, based on at least two of the time information, the location information, the orientation information, the season information, the illuminance information, the angle information or the weather information, a subset of scene images matching the parameters from a set of scene images comprised in a cloud database; and
   obtaining a scene image matching the target scene object from the subset of scene images,
   wherein the obtaining the scene image matching the target ct from the subset of scene images comprises:
   zeroing a feature matching weight for each scene object other than the target scene object in the media image, and determining from the subset of scene images a scene image having a highest matching degree with the target scene object as the scene image matching the target scene object.

2. The method of claim 1, comprising:
   performing removal processing on the first region of the media image corresponding to the target shielding object.

3. The method of claim 1,
   wherein the performing the image inpainting on the first region of the media image corresponding to the target shielding object to generate the target media image comprises:
   performing image registration between the scene image and the target scene object, and determining from the scene image a second region corresponding to the first region; and
   merging the second region and the media image to obtain the target media image.

4. The method of claim 1, wherein the performing the image inpainting on the first region of the media image corresponding to the target shielding object to generate the target media image comprises:
   performing, based on a pre-trained neural network model, image restoration on the first region of the media image corresponding to the target shielding object to generate the target media image.

5. The method of claim 1, wherein the determining the target shielding object from the media image comprises:
   performing pixel segmentation on shielding objects contained in the media image, to obtain a two-dimensional mask image of the shielding objects, the shielding objects at least partially shielding the target scene object, and a region where each shielding object is located in the two-dimensional mask image corresponding to a class label;
   determining a region where a main shielding object is located in the two-dimensional mask image based on the class label; and determining the shielding object contained in the two-dimensional mask image excluding the region where the main shielding object is located as the target shielding object.

6. The method of claim 5, wherein the determining the region where the main shielding object is located in the two-dimensional mask image based on the class label comprises:
determining, based on a convolutional neural network, a region of pixels corresponding to a class label of the main shielding object as the region where the main shielding object is located; or
determining a region of pixels corresponding to a class label selected by a user as the region where the main shielding object is located.

7. The method of claim 1, wherein determining, based on at least two of the time information, the location information, the orientation information, the season information, the illuminance information, the angle information or the weather information, a subset of scene images matching the parameters from a set of scene images comprised in the cloud database comprises:
receiving, via a search box of the cloud database, the at least two of the time information, the location information, the orientation information, the season information, the illuminance information, the angle information or the weather information; and
searching from the cloud database for the subset of scene images whose characteristics matching the at least two of the time information, the location information, the orientation information, the season information, the illuminance information, the angle information or the weather information.

8. A device for image processing, comprising:
a processor; and
a storage device configured to store an instruction executable by the processor;
wherein when the instruction stored in the storage device is executed by the processor, the processor is configured to:
obtain a media image, the media image having a target scene object at least partially shielded;
determine a target shielding object from the media image, the target shielding object at least partially shielding the target scene object;
perform image inpainting on a first region of the media image corresponding to the target shielding object to generate a target media image;
obtain parameters of capturing the media image, the parameters comprising at least two of time information of capturing the media image, location information of capturing the media image, orientation information of capturing the media image, season information of capturing the media image, illuminance information of capturing the media image, angle information of capturing the media image, and weather information of capturing the media image;
determine, based on at least two of the time information, the location information, the orientation information, the season information, the illuminance information, the angle information or the weather information, a subset of scene images matching the parameters from a set of scene images comprised in a cloud database; and
obtain the scene image matching the target scene object from the subset of scene images;

wherein the processor is configured to obtain the scene image matching the target scene object from the subset of scene images by,
zeroing a feature matching weight for each scene object other than the target scene object in the media image, and determining from the subset of scene images a scene image having a highest matching degree with the target scene object as the scene image matching the target scene object.

9. The device of claim 8, wherein the processor is configured to perform the image inpainting on the first region of the media image corresponding to the target shielding object to generate the target media image by:
performing image registration between the scene image and the target scene object, and determining from the scene image a second region corresponding to the first region; and
merging the second region and the media image to obtain the target media image.

10. The device of claim 8, wherein the processor is configured to perform the image inpainting on the first region of the media image corresponding to the target shielding object to generate the target media image by:
performing, based on a pre-trained neural network model, image restoration on the first region of the media image corresponding to the target shielding object to generate the target media image.

11. The device of claim 8, wherein the processor is configured to determine the target shielding object from the media image by:
performing pixel segmentation on shielding objects contained in the media image, to obtain a two-dimensional mask image of the shielding objects, the shielding objects at least partially shielding the target scene object, and a region where each shielding object is located in the two-dimensional mask image corresponding to a class label;
determining a region where a main shielding object is located in the two-dimensional mask image based on the class label; and
determining the shielding object contained in the two-dimensional mask image excluding the region where the main shielding object is located as the target shielding object.

12. The device of claim 11, wherein the processor is configured to determine the region where the main shielding object is located in the two-dimensional mask image based on the class label by:
determining, based on a convolutional neural network, a region of pixels corresponding to a class label of the main shielding object as the region where the main shielding object is located; or
determining a region of pixels corresponding to a class label selected by a user as the region where the main shielding object is located.

13. A mobile terminal comprising the device of claim 8, further comprising a display screen configured to display the media image,
wherein the processor is further configured to:
perform removal processing on the first region of the media image corresponding to the target shielding object;
wherein the target media image is a pure background image without any target shielding object including humans, wherein the mobile terminal is configured to remove part of the media image within the first region in ensure that the target media image has a realistic effect as the pure background image.

14. The device of claim 8, wherein the processor is further configured to:
receive, via a search box of the cloud database, the at least two of the time information, the location information, the orientation information, the season information, the illuminance information, the angle information or the weather information; and
search from the cloud database for the subset of scene images whose characteristics matching the at least two of the time information, the location information, the orientation information, the season information, the illuminance information, the angle information or the weather information.

15. A non-transitory computer-readable storage medium, having an instruction stored thereon, wherein when the instruction in the storage medium is executed by a processor of a mobile terminal, the mobile terminal is configured to implement an image processing method, the method comprising:
obtaining a media image, the media image having a target scene object at least partially shielded;
determining a target shielding object from the media image, the target shielding object at least partially shielding the target scene object;
performing image inpainting on a first region of the media image corresponding to the target shielding object to generate a target media image;
obtaining parameters of capturing the media image, the parameters comprising at least two of time information of capturing the media image, location information of capturing the media image, orientation information of capturing the media image, season information of capturing the media image, illuminance information of capturing the media image, angle information of capturing the media image, and weather information of capturing the media image; and
determining, based on at least two of the time information, the location information, the orientation information, the season information, the illuminance information, the angle information or the weather information, a subset of scene images matching the parameters from a set of scene images comprised in a cloud database; and
obtaining a scene image matching the target scene object from the subset of scene images;

wherein the obtaining the scene image matching the target scene object from the subset of scene images comprises:
zeroing a feature matching weight for each scene object other than the target scene object in the media image, and determining from the subset of scene images a scene image having a highest matching degree with the target scene object as the scene image matching the target scene object.

16. The non-transitory computer-readable storage medium of claim 15, wherein the method further comprises:
performing removal processing on the first region of the media image corresponding to the target shielding object.

17. The non-transitory computer-readable storage medium of claim 15,
wherein the performing the image inpainting on the first region of the media image corresponding to the target shielding object to generate the target media image comprises:
performing image registration between the scene image and the target scene object, and determining from the scene image a second region corresponding to the first region; and
merging the second region and the media image to obtain the target media image.

18. The non-transitory computer-readable storage medium of claim 15, wherein determining, based on at least two of the time information, the location information, the orientation information, the season information, the illuminance information, the angle information or the weather information, a subset of scene images matching the parameters from a set of scene images comprised in the cloud database comprises:
receiving, via a search box of the cloud database, the at least two of the time information, the location information, the orientation information, the season information, the illuminance information, the angle information or the weather information; and
searching from the cloud database for the subset of scene images whose characteristics matching the at least two of the time information, the location information, the orientation information, the season information, the illuminance information, the angle information or the weather information.

* * * * *